US012254445B2

(12) United States Patent
Salter et al.

(10) Patent No.: US 12,254,445 B2
(45) Date of Patent: Mar. 18, 2025

(54) SYSTEM AND METHOD FOR TOOL ALLOCATION FOR SERVICE VEHICLES

(71) Applicant: FORD GLOBAL TECHNOLOGIES, LLC, Dearborn, MI (US)

(72) Inventors: Stuart C. Salter, White Lake, MI (US); Brendan F. Diamond, Grosse Pointe, MI (US); Meghan Preiss, Detroit, MI (US); Annette Lynn Huebner, Highland, MI (US); Lia Pillen, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 270 days.

(21) Appl. No.: 17/888,554

(22) Filed: Aug. 16, 2022

(65) Prior Publication Data

US 2024/0062156 A1  Feb. 22, 2024

(51) Int. Cl.
*G06Q 10/0875* (2023.01)
*B60W 60/00* (2020.01)
*G06Q 10/083* (2024.01)

(52) U.S. Cl.
CPC ....... *G06Q 10/0875* (2013.01); *G06Q 10/083* (2013.01); *B60W 60/00256* (2020.02); *B60W 2556/45* (2020.02)

(58) Field of Classification Search
CPC ............... G06Q 10/083; G06Q 10/087; G06Q 10/0875; G06Q 10/08; G06Q 50/12; G06V 40/172; G06V 40/11; B60W 2420/403; B60W 60/001
See application file for complete search history.

(56) References Cited

U.S. PATENT DOCUMENTS

| 8,306,731 | B2 | 11/2012 | Waggaman, III |
| 10,613,533 | B1* | 4/2020 | Payson ............... G05D 1/0088 |
| 11,159,942 | B2 | 10/2021 | Zeiler et al. |
| 11,830,058 | B2* | 11/2023 | Ferguson ........... G01C 21/3453 |
| 11,935,280 | B2* | 3/2024 | Aslandere ................ G06T 7/70 |
| 2010/0265061 | A1* | 10/2010 | Harmon ................ G06Q 10/08 |
| | | | 340/539.13 |
| 2012/0209470 | A1* | 8/2012 | Gilbert ................ G06Q 10/087 |
| | | | 707/769 |
| 2014/0236778 | A1* | 8/2014 | Villardito ............. G06Q 10/087 |
| | | | 705/28 |
| 2015/0202770 | A1* | 7/2015 | Patron .................... G06Q 50/01 |
| | | | 901/50 |

(Continued)

FOREIGN PATENT DOCUMENTS

WO         2021030549 A1    2/2021

*Primary Examiner* — Florian M Zeender
*Assistant Examiner* — Vanessa Deligi
(74) *Attorney, Agent, or Firm* — Joseph Zane; Brooks Kushman, P.C.

(57) ABSTRACT

A tool application system for a vehicle may include a database configured to maintain an inventory of items on a vehicle, and a server configured to receive a request for at least one item relating to a worksite from a technician, compare the request for the at least one item to the inventory, determine that the item is not part of the inventory, transmit a part request to at least one location based on at least one factor, and transmit instructions to the vehicle in response to receiving a response to the request from the location confirming availability of the item.

16 Claims, 3 Drawing Sheets

(56) References Cited

U.S. PATENT DOCUMENTS

| | | | |
|---|---|---|---|
| 2016/0189287 A1* | 6/2016 | Van Meter | H04W 4/029 |
| | | | 705/15 |
| 2018/0144302 A1* | 5/2018 | Murray | G06V 40/10 |
| 2018/0157258 A1* | 6/2018 | O'Brien | G05D 1/0088 |
| 2019/0025819 A1* | 1/2019 | Ferguson | G05D 1/0088 |
| 2020/0055671 A1 | 2/2020 | Toebes et al. | |
| 2022/0019213 A1* | 1/2022 | Haghighat Kashani | |
| | | | G05D 1/0231 |

\* cited by examiner

SYSTEM AND METHOD FOR TOOL ALLOCATION FOR SERVICE VEHICLES

TECHNICAL FIELD

Aspects of the disclosure generally relate to systems and methods for tool allocation for service vehicles.

BACKGROUND

Vehicles are often dispatched to job site, construction sites, manufacturing facilities, etc. Often times, once the vehicles arrive at the site, they are parked for a long duration.

SUMMARY

A tool application system for a vehicle may include a database configured to maintain an inventory of items on a vehicle, and a server configured to receive a request for at least one item relating to a worksite from a technician, compare the request for the at least one item to the inventory, determine that the item is not part of the inventory, transmit a part request to at least one location based on at least one factor, and transmit instructions to the vehicle in response to receiving a response to the request from the location confirming availability of the item.

A tool application system for a vehicle, may include a database configured to maintain an inventory of items on a vehicle, and a server configured to transmit a part request to at least one location based on at least one factor, transmit instructions to the vehicle in response to receiving a response to the request from the location confirming availability of the item, the instructions including autonomously driving to the location, verify at least one of a delivery person and item at the location, and instruct at least one vehicle door to open in response to verifying the at least one delivery person and item.

A method for locating an item using tool application for a vehicle may include receiving a request for at least one item relating to a worksite from a technician, comparing the request for the at least one item to a current vehicle inventory, determining that the item is not part of the inventory, transmitting an item request to at least one location based on at least one factor, and transmitting instructions to the vehicle in response to receiving a response to the request from the location confirming availability of the item.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
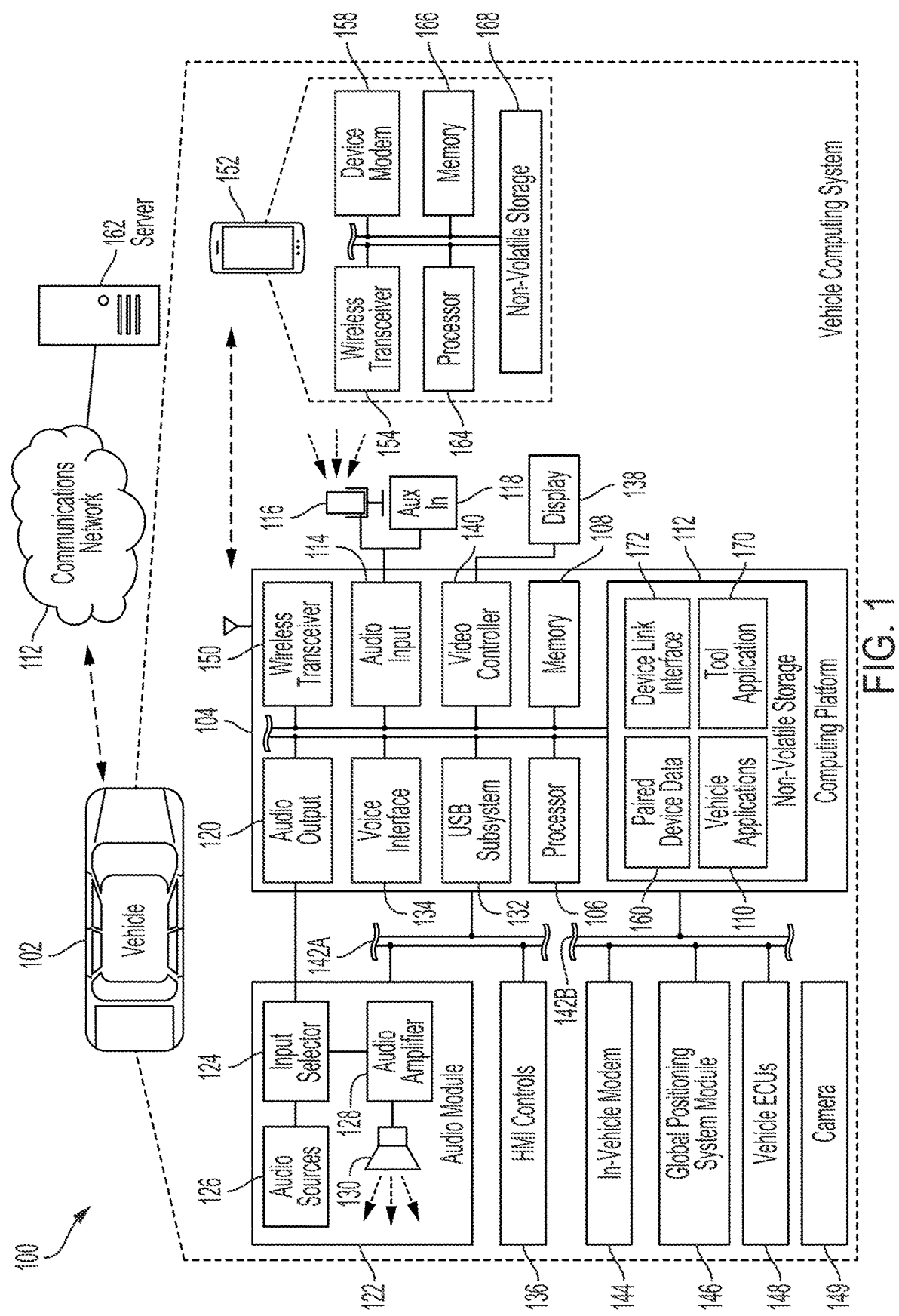
FIG. 1 illustrates an example diagram including a vehicle configured to access telematics servers and a mobile device having a tool allocation application.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles are often used to on worksites to monitor progress, issues, and ensure the vehicles are utilized as much and as efficiently as possible while on a job. In an effort to further utilize the vehicles, the vehicles may also be used to help ensure that the correct items to complete a job are available. For example, the job may require certain tools, parts, or materials. By ensuring that the appropriate tools and parts are at the job site, the vehicle helps to eliminate wasted time, rescheduled appointments, etc., that may be caused by a lack of part or tool availability.

Disclosed here are system and methods for leveraging a vehicle's existing sensor suite, user and vehicle interaction, job site scheduling, and other related inputs to help provide a technician with the correct tools or parts for a job site. The worker or technician may perform a preliminary assessment of the job site or task, and determine what parts or tools may be needed to the complete the task. The technician may transmit this list to a tool application, either by making a phone call, inputting the list into an app, etc. The tool application may compare the list with an inventory list to determine if the vehicle needs to acquire additional parts or tools. If parts are needed that are not on-board the vehicle, the tool application will determine the most effective or efficient method to acquire the desired tools or parts based on certain factors (including time, money, etc.). The tool application and/or vehicle may also provide security to ensure that authorized users are accessing the parts. For example, the vehicle may use facial recognition to authenticate the technician.

The system may utilize autonomous driving to drive to a location selling the parts or items that are needed. While the examples disclosed herein are typically referencing an automotive industry, other industries may benefit from the systems and methods described herein. For example, heating, ventilation, and air conditioning (HVAC), plumbing, electrical, carpentry, among a few. A base set of tools may be assumed to be needed for a certain line of work or for a specific fleet. Such lists may be shared among other similar vehicles. In some example, the vehicle may use sensor tags, such as radio frequency identification (RFID) readers, as well as cameras, radar, light detection and ranging (LIDAR), microphones, speakers, and audio exciters to communicate with technicians and drivers. These sensor units may aid to locate the tools and parts within the vehicle. The vehicle may also verify a base set of tools that are generally available on the vehicle. The quantity, part number, dimensions, and shapes may be associated with inventory or parts in the vehicle so that the parts and tools may be recognized by the vehicle. Further, a loaded part or tool list may be aggregated and labeled.

Loading and unloading of new items may be done using the vehicle's sensors and vision systems, user and vehicle interactions, and tracking using RFID tags. The user may also communicate with the vehicle via the vehicle speakers to audibly convey parts and items.

FIG. 1 illustrates an example system 100 including a vehicle 102 configured to access telematics servers and a mobile device 152 having various applications. In one example, though not shown, the mobile device may include a tool application 170, described herein. The vehicle 102 may include various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the vehicle 102 may include the SYNC system manufactured by The Ford Motor Company of Dearborn, MI. It should be noted that the illustrated system 100 is merely an example, and more, fewer, and/or differently located elements may be used.

The vehicle 102 may include a computing platform 104. The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output 120 to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM), frequency modulated (FM) or satellite digital audio radio service (SDARS) signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. Different decoding speech strategies may be used, such as, phonetic, isolated word, word spotting, phrase recognition, large vocabulary continuous speech (LVCSR), etc. In some examples, different grammar languages and speech recognition engines may be utilized for the different strategies. The voice interface 134 may utilize probabilistic speech techniques using the grammar in comparison to the input speech. In many cases, the voice interface 134 may include a standard user profile tuning for use by the speech recognition functions to allow the speech recognition to be tuned to provide good results on average, resulting in positive experiences for the maximum number of initial users. In some cases, the system may be configured to temporarily mute or otherwise override the audio source 126 specified by the input selector 124 when an audio prompt is ready for presentation by the computing platform 104 and another audio source 126 is selected for playback.

In some examples, a push-to-talk button may be configured to cause voice interface 134 to begin speech recognition. In another example, an "Open Mic" feature may be implemented where the user simply begins to speak without pressing a button. This may be implemented with a voice operated switch (VOX) or with an advanced LVCSR engine that activates for a predetermined set of phrases or words (e.g., a name of the system followed by please, followed by one of a specific set of verbs). The voice interface 134 may also support barge-in, whereby the speech synthesizer begins to provide a prompt before the user has finished the sentence (which is typical of natural speech where a listener begins to speak as soon as they understand the sentence, but before it is completed). Barge-in may also allow a dialog system to intentionally initiate a dialog during moments of silence, or to interrupt and ongoing conversation. This may be used as a tactic for conveying urgency, thus getting the user's interest.

The computing platform 104 may also receive input from human-machine interface (HMI) controls 136 configured to provide for occupant interaction with the vehicle 102. For instance, the computing platform 104 may interface with one or more buttons or other HMI controls 136 configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle electronic control units (ECUs) 148 configured to incorporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

The vehicle 102 may include at least one camera 149 within or on the vehicle 102. The camera 149 may be a video camera, or configured to take still photos, and may be configured to capture areas inside and around the vehicle. In one example, the camera 149 may be an exterior camera used for parking aids, birds eye views, back up cameras, etc. The camera 149 may also acquire biometric data such as facial images to verify persons and identities.

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, wearable devices, E-textiles or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

A communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention. In some vehicles 102, the computing platform 104 wireless transceiver 154 may be configured to provide hotspot functionality to user's mobile devices 152.

A tool application 170 may be an example of an application installed on the vehicle 102. The tool application 170 may be configured to utilize information from vehicle sensors, actuators and electronic control units made available via the vehicle bus 142. The tool application 170 may also be configured to receive user input form a mobile device 152. The tool application 170 may be further configured to communicate with servers (e.g., server 162) via the communications network 156. The user may interact with the tool application 170 through the HMI of the mobile device 152, via a web interface, or via the HMI of the vehicle 102. While illustrated and discussed as being part of the vehicle 102, the tool application 170 may also be stored on the mobile device 152, and server 162. The tool application 170 may also be configured to process images from the camera 149, which is discussed in more detail herein.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server or shuttle server 162 or other network services via the device modem 158. The computing platform 104 may also include a device link interface 172 to facilitate the integration of functionality of the mobile applications into the grammar of commands available via the voice interface 134. The device link interface 172 may also provide the mobile applications with access to vehicle information available to the computing platform 104 via the in-vehicle networks 142. An example of a device link interface 172 may be the SYNC APPLINK component of the SYNC system provided by The Ford Motor Company of Dearborn, MI.

Figure 2:
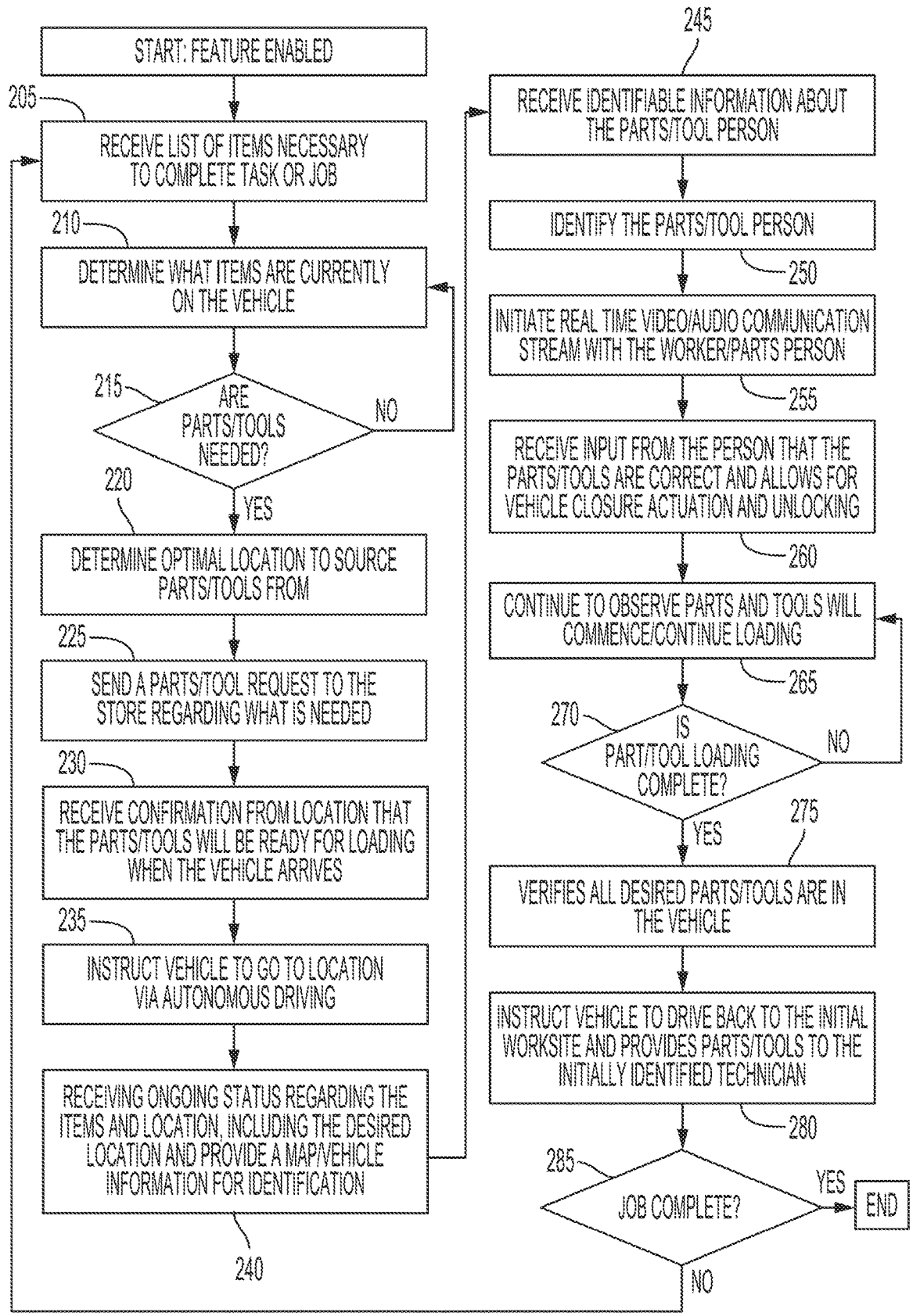
FIG. 2 illustrates an example process for the tool allocation application.

FIG. 2 illustrates an example process for a tool system process 200 for the tool application 170. At block 205, the tool application 170 may receive a list of parts and tools that are needed to complete the job. This may be input by a technician via an app, a phone call, etc. This preliminary analysis may be done by the worker or technician at the work site.

At block 210, the tool application 170 may compare the vehicle's part and tool inventory with that of the received list. For example, the tool application 170 may access a database configured to maintain an inventory of the items available on a vehicle 102.

The application 170 may determine, at block 215, whether all of the listed items on the received list are on the vehicle 102. If so, the process 200 proceeds to block 220. If not, the process 200 returns to block 210. In this case, the vehicle 102 will stay onsite in a parked location until the need for items changes. However, it is possible that the vehicle may need to leave the job site for reasons unrelated to the vehicle's inventory, such as for gas, meals, medication, etc. Further, in some examples, the vehicle 102 may have a tool or part that could be used by another vehicle. The vehicle may deliver this to the other vehicle, job site, etc.

At block 220, in response to at least a portion of the parts and tools not being present on the vehicle, the application 170 may then determine the most optimal location to purchase the parts or tools. This may include meeting up with a different fleet vehicle at a nearby location, going to the company headquarters or parts hub or storage. Oher locations may be stores, or rental facilities. The metrics and factors used to determine the most optimal location to locate the part may be based on minimizing price, time, travel distance, number of other parts available at a location. Other metrics may include jobsite delay due to the missing item, lost opportunity charges, price of the part and tool, headquarters or part store distance from the vehicle, time of day, appointment times, rental availability, etc.

At block 225, the application 170 may transmit a request to the location, such as the respective store, for the needed parts or tools. In some examples, more than one location may be selected where more than one part or tool is needed. The request may identify the part, as well a time for a pickup.

At block 230, the application 170 may receive a response and confirmation from the location(s) to verify that the parts or tools are available at those locations. The response may include information such as where to pick up the items, the worker delivering the items, etc.

At block 235, the application 170, in response to receiving a confirmation response from the at least one location, may instruct the vehicle to autonomously drive to the location. If more than one location is necessary, the application 170 may provide instructions based on a more optimal route. During driving, the vehicle may be in continuous communication with the location about the status of the item. This may ensure that when the vehicle arrives, the location is ready to provide the item, including having persons ready to load the items, etc. The vehicle may also receive additional requests while enroute. This may be for additional items, food, an errand, etc.

At block 240, the location may transmit to the application 170 the ongoing status, etc., of the part or tool. This may include specific locations of the part or tool at the location, maps to the location, etc.

At block 245, the application 170, once at the vehicle, may receive identifiable information about the parts or tools and delivery personnel, etc. Further, and prior to this, the vehicle may send out its status regarding its GPS location so the person to load the items can find the vehicle at the location, e.g., within the parking lot, within the storage facility, etc. The vehicle status may include information regarding the vehicle shape, size, color, model year, model, trim, license plate, lettering/advertisements on the side of the vehicle, appearance, etc. In addition, images or photos of what the vehicle looks like may be sent.

The vehicle may also provide a map regarding its location relative to the part/tool source using the vehicle GPS and existing map systems within the vehicle. As explained above, the status will be communicated using the in-vehicle modem, WiFi, or other wireless means of communication.

At block 250, the application 170 may receive a response from the location. This response may include an indication that the parts/tool loading personnel has left the location with all of the parts and tools. The location's response may include identifying information such as the personnel's name, facial appearance, physical stature, badge number, or other identifiable information to help the vehicle recognize who is coming to the vehicle. The loading personnel may make their way to the vehicle and upon approach the vehicle. RFID chips, wearable items, door codes, or receipts may also be used to authenticate identification of the personnel. Biometric information about an individual loading the parts or tools may also be used. This may include facial recognition, fingerprinting, etc.

The application 170 may also instruct the vehicle to flash its lights and/or play sounds/music so that the loading personnel can easily identify which vehicle the parts/tools are for.

At block 255, the vehicle camera 149 may initiate a real time video. The vehicle speakers 130 may initiate a real-time audio communication stream as well. This streaming may facilitate communication between the technician and the location employee to allow for initiation of loading of the parts or tools the application may then perform authentication of the parts, tool loading personnel via facial recognition, identifying the personnel's badge, objects in their possession (desired parts, tools), or other types of identification as provided by the store (passcodes, phrases, etc.). Authentication will occur using the vehicle's existing sensor suite such as the cameras 149, ultra-wideband (UWB), LIDAR, etc. For example, bar codes on boxes may be scanned by the vehicle.

At block 260, the application 170 may receive input from the technician to open the door to the vehicle. The technician may allow the door to open in response to the parts or tools being correct. The technician may then agree that the parts or tools should be loaded into the vehicle and part or tool loading will commence. The vehicle will then use its sensor suite and input from the loading personnel regarding which vehicle closures to unlock and open. The loader will then be able to commence loading. This process can occur multiple times at different locations around the vehicle until the parts or tools requirement are satisfied and can complete the job. Notably, the application 170 may transmit instructions to automatically open a specific door.

At block 265, the application 170, via the camera 149 and/or microphone 116, continues to observe the parts and tools being loaded. In addition to this, the technician may continue to observe the loading of the items. That is, during the loading process, the vehicle may perform security surveillance to ensure nothing is stolen from the vehicle and to check part or tool placement in the vehicle to ensure they are secure and will not be compromised during transportation. In one example, if the personnel steps away from the vehicle by a predetermined distance or the vehicle realizes another person is getting close to the vehicle (leverage the security sentinel feature) that is not authorized to load parts or tools, the vehicle will close and lock the related doors or compartments as needed.

In another example, the cameras 149 are used to identify that parts or tools are placed inside of the vehicle 102 and that nothing is taken out. The technician may monitor the personnel's movements and actions using the vehicle cameras 149 or microphones 116 and alert the police if an issue arises. If the parts or tools are placed in a location in which they are free to move around and become compromised or compromise the vehicle, the technician or tool application may instruct the user how to load the parts and tools to prevent impairment. Preconfigured areas within the vehicle may be identified up to allow for parts/tool loading to ensure minimal movement is realized.

At block 270, the application 170 may determine whether the loading is complete. This may be achieved by a sensor or input that indicates a door has been closed, feedback from the technician, among other mechanisms.

At block 275, the application 170 may verify that all parts are located on the vehicle 102, or at least the parts that should have been loaded at that location. That is, once the parts or tool loader signifies that the vehicle loading is complete, the vehicle 102, via the application 170, may do additional verification using the interior vision system to check the quantity, identity, and/or location of new items in the vehicle and compare against what was ordered.

At block 280, the application 170 instructs the vehicle to drive back to the worksite to provide the items to personnel at the worksite.

At block 285, the application 170 may determine if the job is complete. If so, the process 200 may end. If not, the process 200 may return to block 205.

In addition to the above, the application 170 may provide further instructions for additional functions to be completed by the vehicle. For example, if the part or item was rented, the application 170 may provide instructions for the part to be returned to the location. In another example, if the wrong item was received, the item may be returned or exchanged.

Figure 3:
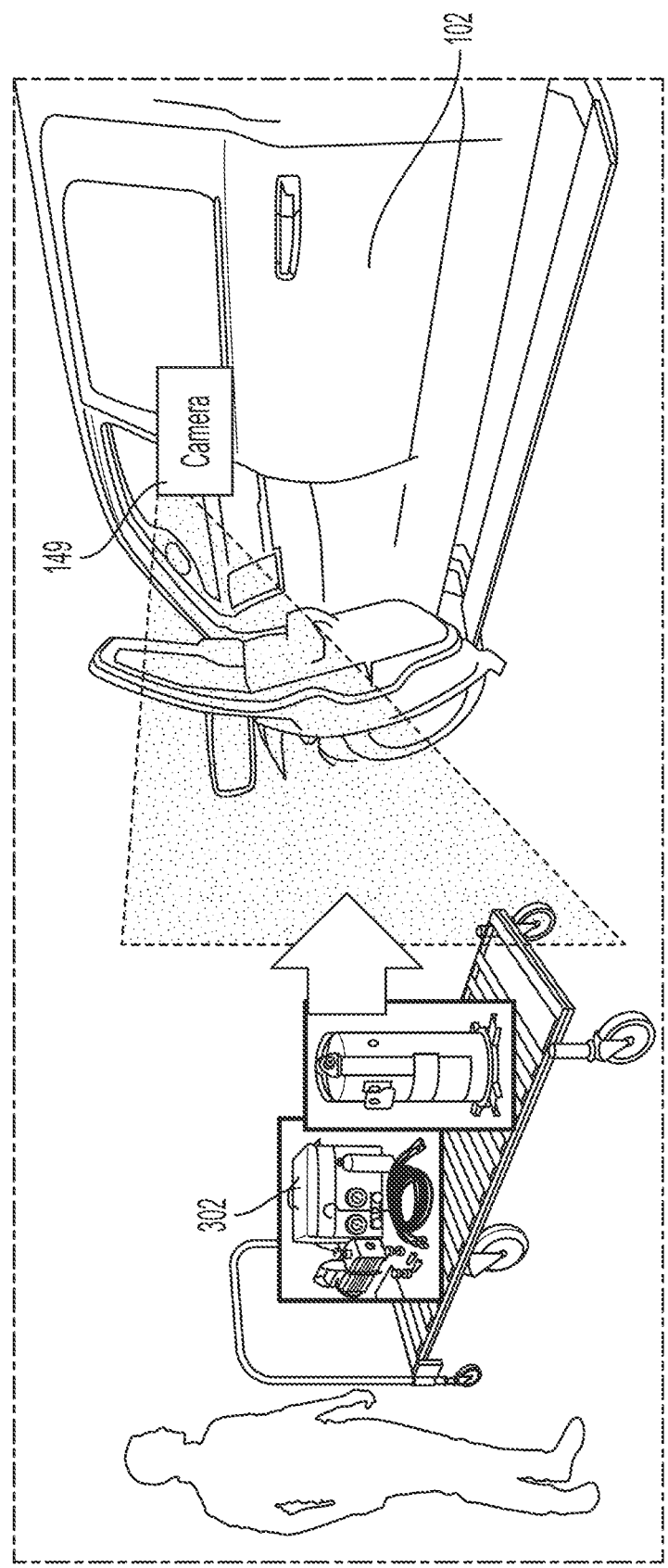
FIG. 3 illustrates an example vehicle and inventory delivery situation for the tool allocation application of FIG. 1.

FIG. 3 illustrates an example vehicle and inventory delivery situation. The vehicle 102 may be similar to vehicle 102 illustrated in FIG. 1. The vehicle 102 may include at least one of the cameras 149 configured to acquire images of the inventory 302. The camera 149 may also be configured to acquire biometric images such as images of a technician's or delivery person's face to validate or authenticate the user. The camera 149 may also inventory items within the vehicle, acquire QR or bar codes, etc. In one example, the tool application 170 may determine a method of identification, such as facial recognition. Based on the response from the location (e.g., at block 270), the tool application 170 may expect a certain employee of the location. The tool application 170 may also expect delivery or intake at a certain location of the vehicle, such as a specific door or compartment. The camera 149 may be associated with the location. Once at the location, the vehicle 102 may open the specific door, and initiate a live stream of the actions via the camera 149. The technician may verify that the part and tools are correct. Once the parts or inventory are in the vehicle, the vehicle may shut and lock the doors and return to the worksite.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tool application system for a vehicle, comprising:
   a database configured to maintain an inventory of items on a vehicle;
   a vehicle camera configured to capture a live-stream of a delivery at at least one location; and
   a server configured to
      receive a request for at least one item relating to a worksite from a technician,
      compare the request for the at least one item to the inventory,
      determine that the at least one item is not part of the inventory,
      transmit a part request to the at least one location based on at least one factor,
      transmit instructions to the vehicle in response to receiving a response to the part request from the location confirming availability of the at least one item, and
      receive an image of a delivery person and the at least one item from the camera and authenticate the delivery person and the at least one item at the location based on the image,
      instruct at least one vehicle door to open in response to verifying the delivery person and the at least one item.

2. The system of claim 1, wherein the at least one factor is item value.

3. The system of claim 1, wherein the server is further configured to instruct the vehicle to autonomously drive to the location.

4. The system of claim 1, wherein the server is further programmed to receive confirmation from the technician that the at least one item was delivered.

5. The system of claim 1, wherein the server is further programmed to instruct the vehicle to autonomously drive to the worksite in response to confirming that the at least one item was delivered.

6. A tool application system for a vehicle, comprising:
   a database configured to maintain an inventory of items on a vehicle;
   a vehicle camera configured to capture a live-stream of a delivery at at least one location; and
   a server configured to
      transmit a part request for at least one item to the at least one location based on at least one factor,
      transmit instructions to the vehicle in response to receiving a response to the request from the location confirming availability of the at least one item, the instructions including autonomously driving to the location,
      receive an image of a delivery person and at least one item from the camera and verify the delivery person and the at least one item at the location based on the image, and
      instruct at least one vehicle door to open in response to verifying the delivery person and the at least one item.

7. The system of claim 6, wherein the server is further configured to receive a request for the at least one item relating to a worksite from a technician;
   compare the request for the at least one item to the inventory;
   determine that the at least one item is not part of the inventory.

8. The system of claim 7, wherein the at least one factor is item value.

9. The system of claim 7, wherein the server is further configured to instruct the vehicle to autonomously drive to the location.

10. The system of claim 7, wherein the server is further programmed to receive confirmation from the technician that the at least one item was delivered.

11. The system of claim 6, wherein the server is further programmed to instruct the vehicle to autonomously drive to a worksite in response to confirming that the at least one item was delivered.

12. A method for locating an item using tool application for a vehicle, comprising:
   receiving a request for at least one item relating to a worksite from a technician;
   comparing the request for the at least one item to a current vehicle inventory;
   determining that at least one missing item of the at least one item is not part of the inventory;
   transmitting an item request for the at least one missing item to at least one location based on at least one factor; and
   transmitting instructions to the vehicle in response to receiving a response to the item request from the location confirming availability of the at least one missing item;
   receiving an image of a delivery person and the at least one missing item, and verifying the delivery person and the at least one missing item at the location; and
   instructing at least one vehicle door to open in response to verifying the delivery person and the at least one missing item.

13. The method of claim 12, wherein the at least one factor is item value.

14. The method of claim 12, further comprising instructing the vehicle to autonomously drive to the location.

15. The method of claim 12, further comprising receiving confirmation from the technician that the the at least one item was delivered.

16. The method of claim 15, further comprising instructing the vehicle to autonomously drive to the worksite in response to confirming that the the at least one item was delivered.

* * * * *